United States Patent Office 2,963,103
Patented Dec. 6, 1960

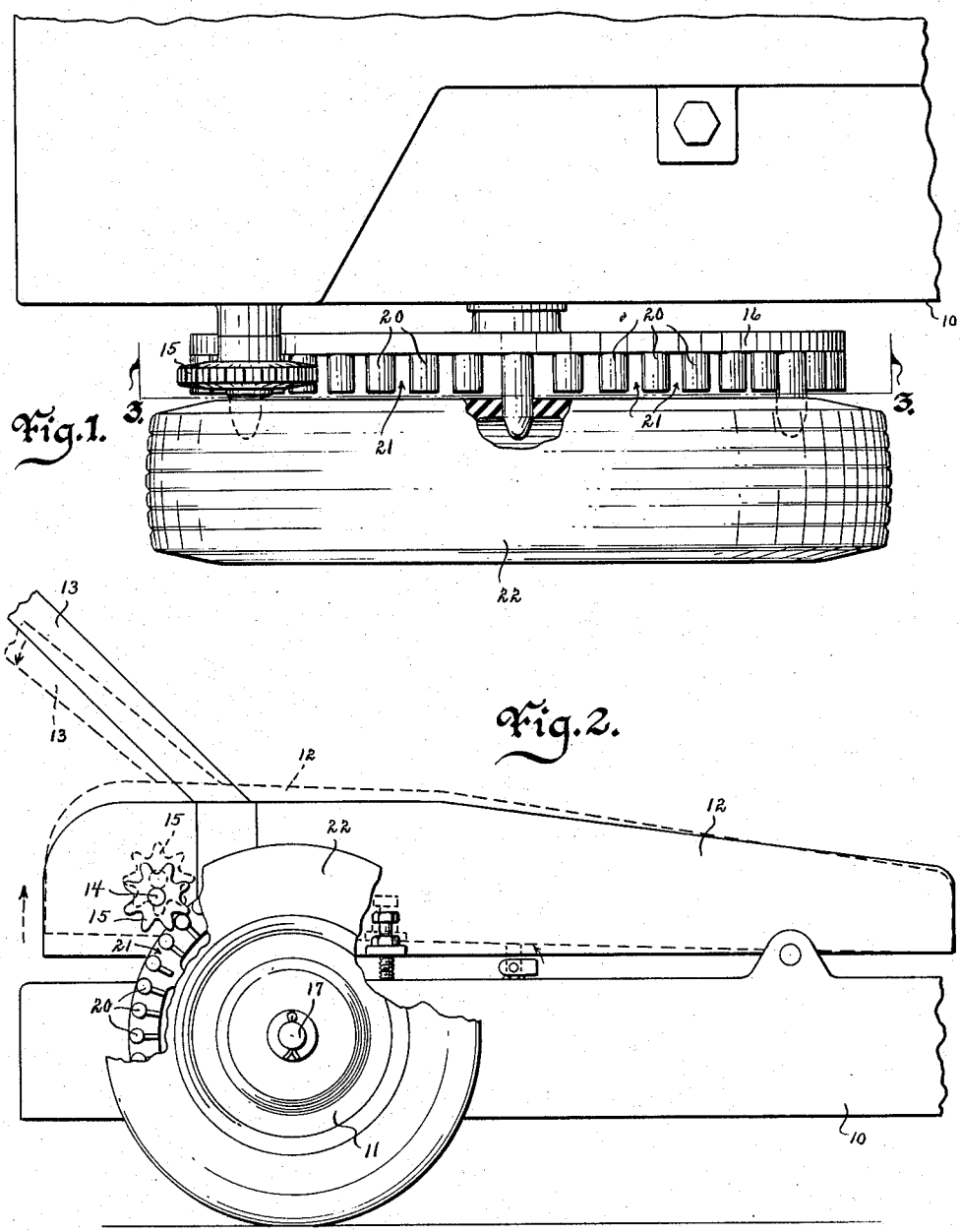

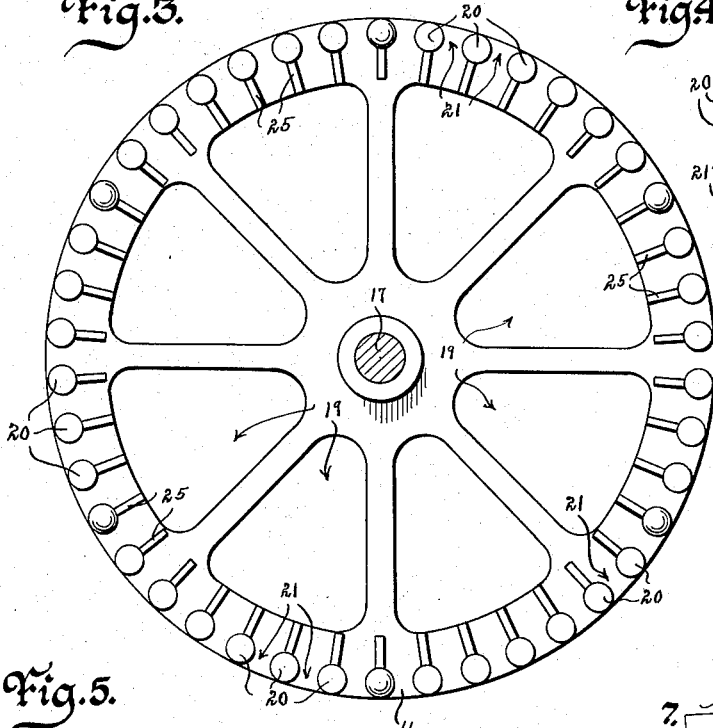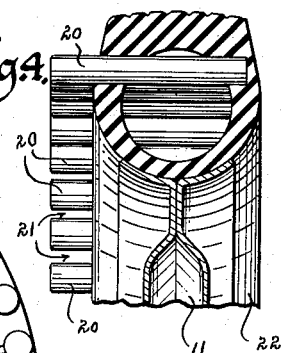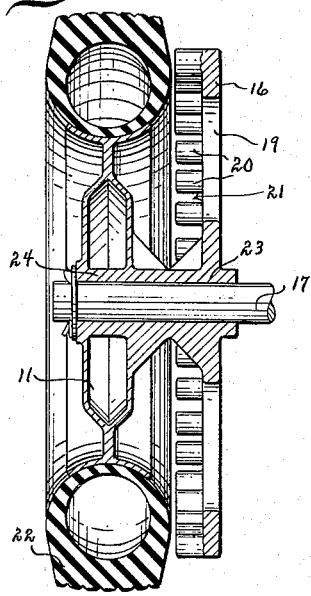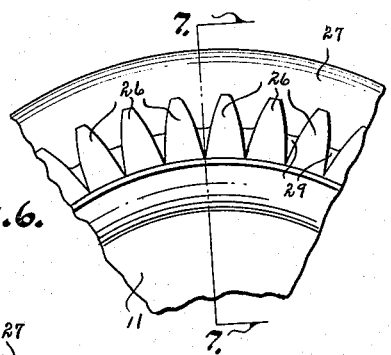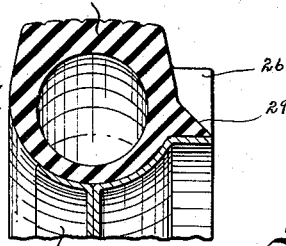

2,963,103
TRACTION WHEEL DRIVING MEANS

George I. Wood, Jr., and Floyd C. Egley, Des Moines, Iowa, assignors to Western Tool and Stamping Company, Des Moines, Iowa, a corporation of Iowa Filed Sept. 23, 1959, Ser. No. 841,838

6 Claims. (Cl. 180—70)

This invention relates to a means for power driving of the traction wheel or wheels of a vehicle, and more particularly to a rear wheel gear driving means for self-propelled mowing machines.

In recent years it has become quite common to use the motors of lawnmowers that actuate the vegetation cutting means to also propel the machine across the lawn surface. Obviously, there are times when it is not desirable to have the traction wheels of the mowing machine in gear with the motor and, therefore, it has been necessary to provide some type of manually operated clutch means between the prime mover and the traction wheels. Such clutch means not only adds to the cost of manufacturing the mowing machine but is awkward to use. Some effort to overcome these problems has been made by providing a ring gear on the traction wheels for receiving a handle actuated swingable powered pinion gear assembly. By such a structure the power connection between the motor and the traction wheels is accomplished merely by raising the guiding handle of the mowing machine to place the same in gear, and by lowering the guiding handle to disengage the gears. While such a power transmission does solve many problems, it is highly objectionable in that cut grass and other foreign matter readily collect and wedge between the teeth of the ring gears operatively secured to the drive wheels of the mowing machine.

Therefore, the principal object of our invention is to provide a ring gear means for the drive wheels of power mowing machines that does not become clogged and inoperative by particles of cut vegetation and like foreign matter.

More specifically, the object of this invention is to provide a self-cleaning ring gear for the drive wheels of power mowing machines and like.

Still further objects of our invention are to provide a means for powering the drive wheels of mowing machines and like that is economical in manufacture and durable in use.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Fig. 1 is a top plan view of our gear means,

Fig. 2 is a side view of our means of operatively connecting the driving wheels of a mowing machine to the mowing machine motor, and with sections cut away to more fully illustrate its construction, Fig. 3 is an enlarged outside view of one of our traction wheel ring gears, Fig. 4 is an enlarged sectional view showing a modified structure of securing the teeth of a ring gear to a drive wheel, Fig. 5 is an enlarged cross sectional view of still another variation of our invention, Fig. 6 is still another variation of our ring gear and wherein the same is a part of the drive wheel per se, and Fig. 7 is an enlarged cross sectional view of the gear means shown in Fig. 6 and is taken on line 7—7 of that figure.

In these drawings we have used the numeral 10 to designate the chassis of an ordinary lawnmower. Such chassis are supported by three or four wheels, and we use the numeral 11 to designate one of the supporting drive wheels. In most such mowing machines the two rear wheels are used as traction drive wheels and, as herebefore indicated, a ring gear is operatively secured on the inner side of each of these two rear wheels. It is common practice to have a hinged belt housing 12 and a guiding handle 13 pivoted to the chassis 10 and engageable with the rear portion of the housing 12 so that when the handle 13 is moved upwardly it will lower the rear end of the belt housing, and when the handle 13 is lowered it will move the rear end of the belt housing 12 upwardly. Such belt housings carry a rotatable shaft 14 which is operatively connected to the prime mover of the mowing machine by pulley wheels and a belt (not shown). On each of the outer ends of the shaft 14 is a sprocket wheel 15 adapted to engage the ring gears that are operatively secured to each of the two rear driving and supporting wheels of the mowing machine. By such arrangement when the handle 13 is manually raised, the teeth of the gear wheels 15 will be lowered into engagement with the teeth of the ring gears, and when the handle is lowered, the gear wheels 15 will be raised to positions out of engagement with the ring gears that are operatively secured to the drive wheels.

The elements thus far described are standard in powered mowing machines and it is to such equipment that we install our specific traction wheel ring gears and which we will now describe in detail.

In Figs. 1, 2 and 3 we show a disc wheel 16 rotatably mounted on the axle 17 of the mowing machine. One of these wheels 16 is placed at the inner side of each of the rear traction wheels of the mowing machine. The disc wheel has large openings 19 in its central areas as shown in Fig. 3, the purpose of which will later be appreciated. Extending outwardly from the outside face of the disc wheel is a plurality of evenly spaced apart projections 20, circular in cross section, as shown in Fig. 2. These members 20 are in the form of stub shaft pins and form a continuous row of spaced apart teeth near the periphery of the disc wheel 16, as shown in Fig. 3. By such a construction there is a space 21 between each of these stub pins 20 and these spaces 21 communicate with the outlet openings 19 of the wheel plate 16. Any suitable means may be employed to operatively connect the stub pins 20 to the drive wheel 11, and in Fig. 1 we accomplish this by extending the length of some of the pins 20 to extend into the tire 22 of the wheel 11. In Fig. 5 we accomplish the securing of the shaft pins 20 to the wheel by rigidly connecting the hub 23 of the disc wheel 16 directly to the hub 24 of the wheel 11. Regardless, however, of how the pin projections 20 are operatively secured to the drive wheel, this continuous row of the spaced apart pins 20 forms the teeth to be engaged by the gear wheel 15, as shown in Fig. 1.

In Fig. 4 we accomplish the same result by dispensing with the disc wheel 16 and imbedding all of the teeth pins 20 substantially through the rubber tire 11. When in use any undesirable foreign matter that would collect in the spaces 21 between the pin teeth 20 would be automatically pushed inwardly therefrom by the teeth of the spurred gear 15 when the same is placed into engagement with our ring gear. Such foreign matter would pass inwardly from the spaces 21 and then be discarded through the openings 19 of the disc wheel. If the structure shown in Fig. 4 is used, the undesirable foreign matter would be forced inwardly through the spaces 21 and thence would fall directly to the ground and from the machine.

To further strengthen and support the inwardly and laterally extending teeth pins 20 on the disc plate 16, we have provided a brace web 25 that extends from the inner side of each of the pin teeth of the disc wheel 16, as shown in Fig. 3.

In Figs. 6 and 7 we show a modified form of structure in that spaced apart teeth 26 are molded with and are an integral part of an especially designed rubber tire 27. In order that the spaces between the teeth 26 will be self-cleaning, we provide a filler web 29 between each of the teeth 26. This portion 29, which is an integral part of the tire 27, extends downwardly and outwardly, as shown in Fig. 7, for directing and guiding any undesirable material collected between the teeth. The teeth of the spur gear 15 will force such foreign matter inwardly and laterally outwardly from between the teeth by causing the same to follow the inclined surfaces of the web portions 29.

From the foregoing it will be appreciated that we have provided a gear means for operatively connecting a prime mover to a drive wheel or drive wheels that is simple of construction, quiet in operation, and is self-cleaning.

Some changes may be made in the construction and arrangement of our traction wheel driving means without departing from the real spirit and purpose of our invention, and it is our intention to cover by our claims, any modified forms of structure or use of mechanical equivalents which may be reasonably included within their scope.

We claim:

1. In a powered self-propelled lawn mower having a frame means, a drive wheel rotatably supported on and disposed in spaced relation to one side of said frame means and a powered shaft swingably mounted on and with respect to said frame means and the rotational axis of said drive wheel, the improvement which comprises a self-cleaning gear drive including a sprocket drivingly mounted for rotation with said shaft and disposed in the space between said wheel and said frame means; said sprocket having radially projecting gear teeth; and a plurality of stub pin shafts secured for rotation with said drive wheel, said stub pin shafts extending laterally with respect to the inside face of said wheel in the space between said wheel and said frame means and in the plane of said sprocket gear teeth, said stub pin shafts being spaced apart and disposed to define a circular gear having a periphery smaller than the periphery of said drive wheel and having stub pin shaft teeth adapted to cooperate with said sprocket gear teeth whereby when said sprocket gear teeth are swung into cooperating engagement with said stub pin shaft teeth, said sprocket drives said wheel and said sprocket gear teeth dislodge foreign material accumulated between said stub pin shaft teeth.

2. In a powdered self-propelled lawn mower, the improvement defined in claim 1 and further including a stub pin shaft support wheel having a periphery smaller than the periphery of said drive wheel; said support wheel being disposed in spaced parallel relation to said drive wheel between said drive wheel and said frame means wherein said stub pin shafts are carried on said support wheel, and wherein said support wheel and said drive wheel are fixed coaxially for rotation with each other.

3. In a powered self-propelled lawn mower, the improvement defined in claim 2 wherein said stub pin shaft support wheel comprises a hub, a peripheral ring, and spokes supporting said ring coaxially with said hub, and wherein said stub pin shafts are carried by said ring in at least substantially equally spaced relation.

4. In a powered self-propelled lawn mower, the improvement defined in claim 1 and further including a stub pin shaft support wheel having a periphery smaller than the periphery of said drive wheel, said support wheel being disposed in spaced parallel relation to said drive wheel between said drive wheel and said frame means; wherein said stub pin shafts are carried on said support wheel; wherein a minor number of said stub pin shafts extend from said support wheel toward and into said drive wheel whereby said support wheel is secured for rotation with said drive wheel, and wherein a major number of said stub pin shafts have one free end terminating in adjacent spaced relation to the inner face of said drive wheel.

5. In a powered self-propelled lawn mower, the improvement defined in claim 1 wherein said drive wheel is provided with an elastomeric tire, and wherein said stub pin shafts have one end portion thereof extending into said tire, and the other end portion thereof unsupported.

6. In a powered self-propelled lawn mower having a frame means; a drive wheel rotatably supported on said frame means, and a powered shaft swingably mounted with respect to said frame means, and the rotational axis of said drive wheel; the improvement which comprises a self-cleaning gear drive including a continuous arcuate row of spaced-apart teeth formed on one side face of, and integral with said drive wheel; an integral ledge web at the bottom of and between each of said teeth extending outwardly of said face of said wheel and downwardly toward the axis of rotation of said wheel, and a spur gear on said powered shaft swingable into engagement with said teeth above the ledge webs therebetween for driving said wheel.

References Cited in the file of this patent

UNITED STATES PATENTS

| 618,652 | Engel | Jan. 31, 1899 |
| 1,198,098 | Bergh | Sept. 12, 1916 |
| 1,275,106 | Trussell | Aug. 6, 1918 |
| 1,311,943 | Andrews | Aug. 5, 1919 |
| 2,631,834 | Butzow | Mar. 17, 1953 |
| 2,751,028 | Laughlin | June 19, 1956 |
| 2,771,959 | Phelps | Nov. 27, 1956 |
| 2,824,415 | Frazier | Feb. 25, 1958 |
| 2,888,833 | Toderick | June 2, 1959 |